(12) United States Patent
Okazawa et al.

(10) Patent No.: US 9,088,710 B2
(45) Date of Patent: Jul. 21, 2015

(54) IMAGE PROCESSING APPARATUS, AND METHOD, AND RECORDING MEDIUM RECORDING IMAGE PROCESSING PROGRAM FOR PROCESSING OUTPUT PIXELS UTILIZED AS PHASE DIFFERENCE DETECTING ELEMENTS

(71) Applicants: OLYMPUS IMAGING CORP., Shibuya-ku, Tokyo (JP); Olympus Corporation, Shibuya-ku, Tokyo (JP)

(72) Inventors: Atsuro Okazawa, Hino (JP); Toshiki Miyano, Yokohama (JP); Osamu Koshiba, Chiba (JP); Kota Mogami, Musashino (JP)

(73) Assignees: Olympus Imaging Corp. (JP); Olympus Corporation (JP)

( * ) Notice: Subject to any disclaimer, the term of this patent is extended or adjusted under 35 U.S.C. 154(b) by 0 days.

(21) Appl. No.: 14/099,026

(22) Filed: Dec. 6, 2013

(65) Prior Publication Data
US 2014/0168480 A1  Jun. 19, 2014

(30) Foreign Application Priority Data
Dec. 7, 2012  (JP) ................. 2012-268097

(51) Int. Cl.
| | |
|---|---|
| H04N 5/232 | (2006.01) |
| H04N 5/369 | (2011.01) |
| H04N 9/04 | (2006.01) |
| G03B 13/36 | (2006.01) |
| G02B 7/28 | (2006.01) |

(52) U.S. Cl.
CPC ......... *H04N 5/23212* (2013.01); *H04N 5/3696* (2013.01); *H04N 9/045* (2013.01)

(58) Field of Classification Search
CPC . H04N 5/23212; H04N 5/3696; H04N 9/045; G03B 13/36; G02B 7/28; G02B 7/36
USPC ......................... 348/345–356, 241; 382/255; 396/79–83, 89–152
See application file for complete search history.

(56) References Cited

U.S. PATENT DOCUMENTS

| | | | | |
|---|---|---|---|---|
| 2012/0133787 | A1* | 5/2012 | Yamaguchi | 348/208.6 |
| 2012/0154637 | A1* | 6/2012 | Hara | 348/239 |
| 2012/0188425 | A1* | 7/2012 | Kita | 348/294 |
| 2014/0028881 | A1* | 1/2014 | Miyatani et al. | 348/246 |

FOREIGN PATENT DOCUMENTS

| | | |
|---|---|---|
| JP | 3592147 | 11/2004 |
| JP | 2010062640 | 3/2010 |

* cited by examiner

*Primary Examiner* — Mekonnen Dagnew
(74) *Attorney, Agent, or Firm* — Volpe and Koenig, P.C.

(57) ABSTRACT

An image processing apparatus includes a first pixel output variation detecting section, a second pixel output variation detecting section, and a pixel correcting section. The first pixel output variation detecting section detects a variation between pixel outputs of the phase difference detecting pixel and the imaging pixel of the same color as the phase difference detecting pixel. The second pixel output variation detecting section detects a variation in pixel output between imaging pixels positioned in vicinities of the phase difference detecting pixel and the imaging pixel used by the first pixel output variation detecting section. The pixel correcting section corrects the pixel output of each phase difference detecting pixel based on results of the first and second pixel output variation detecting sections.

10 Claims, 8 Drawing Sheets

FIG. 9

IMAGE PROCESSING APPARATUS, AND METHOD, AND RECORDING MEDIUM RECORDING IMAGE PROCESSING PROGRAM FOR PROCESSING OUTPUT PIXELS UTILIZED AS PHASE DIFFERENCE DETECTING ELEMENTS

CROSS-REFERENCE TO RELATED APPLICATIONS

This application is based upon and claims the benefit of priority from the prior Japanese Patent Application No. 2012-268097, filed Dec. 7, 2012, the entire contents of which are incorporated herein by reference.

BACKGROUND OF THE INVENTION

1. Field of the Invention

The present invention relates to an image processing apparatus configured to process a pixel output of an image sensor utilizing part of pixels as phase difference detecting elements to thereby detect a focus state, image processing method, and recording medium on which an image processing program is recorded.

2. Description of the Related Art

A proposal concerning an imaging apparatus configured to detect a focus state by utilizing part of pixels of an image sensor as phase difference detecting elements has been made by, for example, Japanese Patent No. 3592147. The imaging apparatus disclosed in Japanese Patent No. 3592147 sets part of pixels of an image sensor to phase difference detecting pixels, focuses subject light flux components passing through different pupil regions symmetrical with respect to an optical axis center of a photographing lens into images on the plurality of phase difference detecting pixels, and detects a phase difference between the subject light flux components to thereby detect a focus state of the photographing lens.

Part of the area of the phase difference detecting pixels is, for example, shaded from light so that the part of the area can receive one of subject light flux components passing through different pupil regions of the photographing lens. As a result, the pixel output of the phase difference detecting pixel cannot be used as an image as it is. Therefore, an imaging apparatus disclosed in Jpn. Pat. Appln. KOKAI Publication No. 2010-062640 makes a pixel output of a phase difference detecting pixel utilizable for recording or display by gain-adjusting the pixel output of the phase difference detecting pixel or interpolating the pixel output by using peripheral pixels.

BRIEF SUMMARY OF THE INVENTION

An image processing apparatus of a first aspect of the present invention is an image processing apparatus configured to process a pixel output from an image sensor including phase difference detecting pixels and imaging pixels arranged in a direction in which a phase difference by obtaining pupil dividing is detected, and comprises: a first pixel output variation detecting section configured to detect a variation between a pixel output of the phase difference detecting pixel and a pixel output of the imaging pixel of the same color as the phase difference detecting pixel, the imaging pixel positioned in a direction different from a direction of phase difference detection carried out by the phase difference detecting pixel; a second pixel output variation detecting section configured to detect a variation in pixel output between a plurality of imaging pixels positioned in vicinities of the phase difference detecting pixel and the imaging pixel used by the first pixel output variation detecting section to detect the variation in pixel output; and a pixel correcting section configured to correct the pixel output of each phase difference detecting pixel on the basis of results of the first pixel output variation detecting section and the second pixel output variation detecting section.

An image processing method of a second aspect of the present invention is an image processing method used to process a pixel output from an image sensor including phase difference detecting pixels and imaging pixels arranged in a direction in which a phase difference by obtaining pupil dividing is detected, and comprises: detecting, by means of a first pixel output variation detecting section, a variation between a pixel output of the phase difference detecting pixel and a pixel output of the imaging pixel of the same color as the phase difference detecting pixel, the imaging pixel positioned in a direction different from a direction of phase difference detection carried out by the phase difference detecting pixel; detecting, by means of a second pixel output variation detecting section, a variation in pixel output between a plurality of imaging pixels positioned in the vicinities of the phase difference detecting pixel and the imaging pixel used by the first pixel output variation detecting section to detect the variation in pixel output; and correcting, by means of a pixel correcting section, the pixel output of each phase difference detecting pixel on the basis of results of the first pixel output variation detecting section, and the second pixel output variation detecting section.

A non-transitory recording medium on which an image processing program of a third aspect of the present invention is a non-temporary recording medium on which an image processing program used to process a pixel output from an image sensor including phase difference detecting pixels and imaging pixels arranged in a direction in which a phase difference by obtaining pupil dividing is detected is recorded, and the image processing program causes a computer to execute: detecting, by means of a first pixel output variation detecting section, a variation between a pixel output of the phase difference detecting pixel and a pixel output of the imaging pixel of the same color as the phase difference detecting pixel, the imaging pixel positioned in a direction different from a direction of phase difference detection carried out by the phase difference detecting pixel; detecting, by means of a second pixel output variation detecting section, a variation in pixel output between a plurality of imaging pixels positioned in the vicinities of the phase difference detecting pixel and the imaging pixel used by the first pixel output variation detecting section to detect the variation in pixel output; and correcting, by means of a pixel correcting section, the pixel output of each phase difference detecting pixel on the basis of results of the first pixel output variation detecting section, and the second pixel output variation detecting section.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Hereinafter, an embodiment of the present invention will be described with reference to the drawings.

Figure 1:
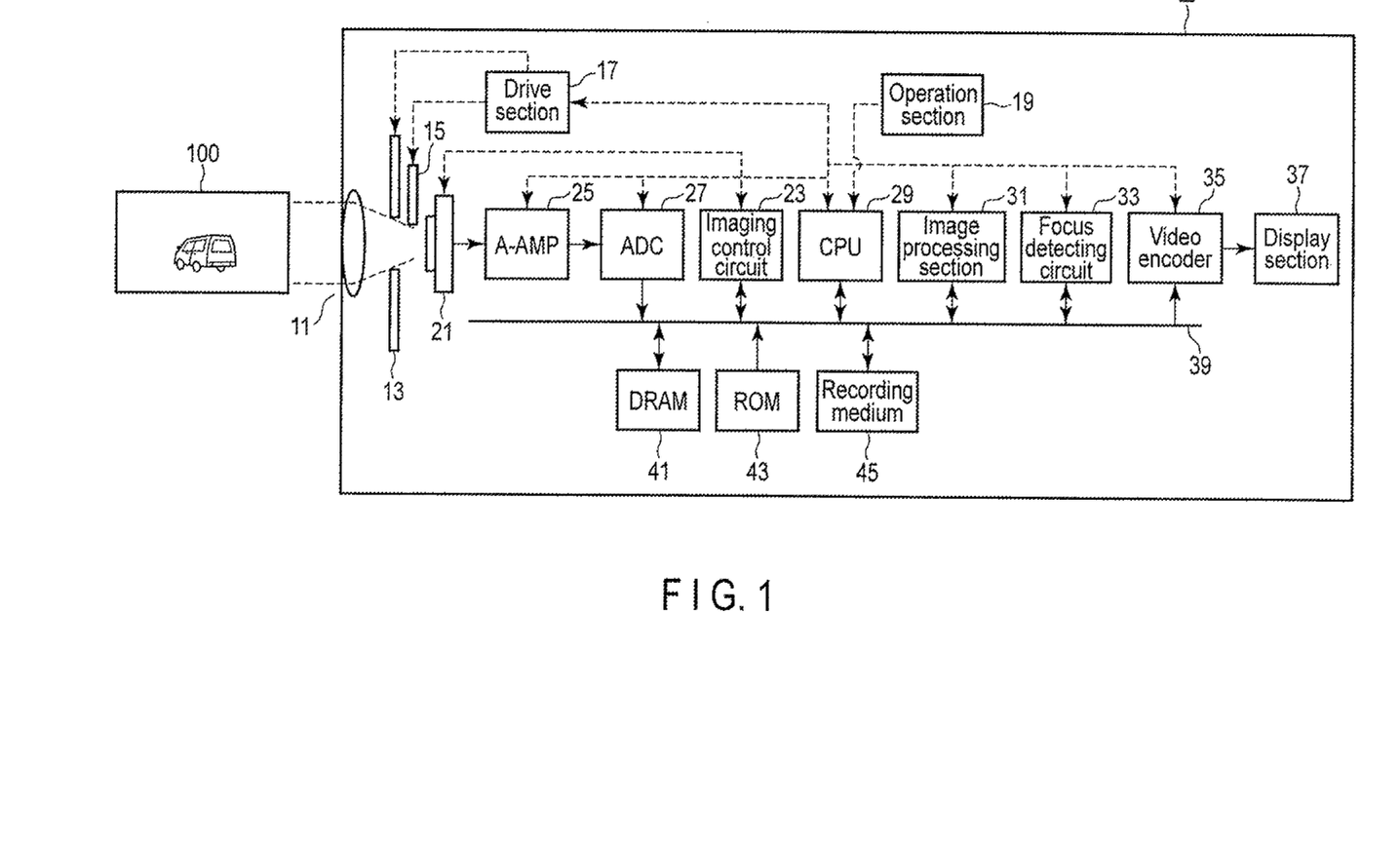
FIG. 1 is a block diagram showing a configuration of a digital camera as an example of an imaging apparatus according to an embodiment of the present invention.

FIG. 1 is a block diagram showing the configuration of a digital camera (hereinafter simply referred to as a camera) as an example of an imaging apparatus provided with an image processing apparatus according to the embodiment of the present invention. Here, each of solid lines with arrows indicates a flow of data, and each of broken lines with arrows indicates a flow of a control signal.

A camera 1 shown in FIG. 1 includes a photographing lens 11, diaphragm 13, mechanical shutter 15, drive section 17, operation section 19, image sensor 21, imaging control circuit 23, A-amplifier 25, analog-to-digital converter (ADC) 27, central processing unit (CPU) 29, image processing section 31, focus detecting circuit 33, video encoder 35, display section 37, bus 39, dynamic random access memory (DRAM) 41, read only memory (ROM) 43, and recording medium 45.

The photographing lens 11 is an optical system constituted of a single lens or a plurality of lenses configured to form an image from a subject 100 on the image sensor 21. The photographing lens 11 may be a unifocal lens or a zoom lens.

The diaphragm 13 is arranged on the optical axis of the photographing lens 11, and is constituted in such a manner that an aperture thereof is variable. The diaphragm 13 controls an amount of light flux from the subject 100 passing through the photographing lens 11.

The mechanical shutter 15 is arranged behind the diaphragm 13, and is constituted freely openable and closable. The mechanical shutter 15 regulates the time of incidence (exposure time of the image sensor 21) of the subject light flux from the subject 100 on the image sensor 21 by having the opening time thereof adjusted. As the mechanical shutter 15, a publicly known focal-plane shutter, lens shutter or the like can be employed.

The drive section 17 carries out focusing of the photographing lens 11, opening size control of the diaphragm 13, and opening/closing control of the mechanical shutter 15 on the basis of a control signal from the CPU 29.

The operation section 19 includes various operation members including various operation buttons such as a power button, release button, reproduction button, and menu button, and a touch panel, and the like. The operation section 19 detects operation states of the various operation members, and outputs a signal indicating a detection result to the CPU 29. Here, it is possible to select a shooting mode of the camera 1 by means of the operation section 19 of this embodiment. That is, it is possible for the user to select the shooting mode of the camera 1 from a still image shooting mode, and moving image shooting mode by operating a shooting mode dial serving as an operation member included in the operation section 19. The still image shooting mode is a shooting mode for shooting a still image, and the moving image shooting mode is a shooting mode for shooting a moving image. Here, although an example in which the shooting mode is selected by using the dial is shown, a configuration in which the shooting mode can be selected by operating, for example, the touch panel on, for example, the menu screen may be employed.

The image sensor 21 is arranged on the optical axis of the photographing lens 11, behind the mechanical shutter 15, and at a position at which the subject light flux is focused into an image by the photographing lens 11. The image sensor 21 includes a photosensitive surface. On the photosensitive surface, photodiodes each constituting the pixels are two-dimensionally arranged. On the front of the photodiodes constituting the pixels, a color filter of, for example, the Bayer arrangement is arranged. The Bayer arrangement includes lines on which R pixels and G (Gr) pixels are alternately arranged and lines on which G (Gb) pixels and B pixels are alternately arranged, in the horizontal direction. Each of the photodiodes constituting the image sensor 21 generates an electric charge proportionate to an amount of received light. The electric charge generated by the photodiode is accumulated in a capacitor connected to each photodiode. The electric charge accumulated in the capacitor is read as an image signal in accordance with a control signal from the imaging control circuit 23. The image sensor 21 in this embodiment has a plurality of different charge reading systems.

Here, the image sensor 21 in this embodiment includes imaging pixels configured to acquire an image for recording or display, and phase difference detecting pixels configured to detect a focus. The phase difference detecting pixels are arranged at positions of part of the imaging pixels. Part of an area of a pixel used as a phase difference detecting pixel is shaded from light unlike other pixels. Details of the image sensor 21 will be described later fully.

The imaging control circuit 23 sets a reading system of the image sensor 21 in accordance with a control signal from the CPU 29, and controls reading of an image signal from the image sensor 21 in accordance with the set reading system. The system of reading image data from the image sensor 21 is set according to an operation state of the camera 1. For example, when a real-time state is required in reading of pixel data from the image sensor 21 (for example, at the time of live-view display or at the time of moving image recording), reading is carried out after pixel data items from a plurality of pixels of the same color are mixed or after pixel data items of particular pixels are thinned out. On the other hand, when image quality is considered more important than the real-time state (for example, at the time of still image recording), mixture reading or thinning-out reading is not carried out, and pixel data of all the pixels is read, whereby resolving power is maintained.

The A-amplifier 25 carries out analog gain adjustment of an image signal output from the image sensor 21. The ADC 27 is an analog-to-digital converter, and converts the image signal which has been subjected to analog gain adjustment into an image signal (pixel data) of a digital form. Hereinafter, in this description, a group of a plurality of pixel data items is described as imaging data.

The CPU 29 carries out control of the entire camera 1 in accordance with a program stored in the ROM 43 to be described later.

The image processing section 31 creates image data by subjecting the imaging data to various image processing operations. For example, at the time of still image recording, the image processing section 31 subjects the imaging data to image processing for still image recording to thereby create still image data. Likewise, at the time of moving image recording, the image processing section 31 subjects the imaging data to image processing for moving image recording to thereby create moving image data. Furthermore, at the time of live-view display, the image processing section 31 subjects the imaging data to image processing for display to thereby create display image data. The detailed configuration of the above-mentioned image processing section 31 will be fully described later.

The focus detecting circuit 33 acquires pixel data from the phase difference detecting pixel, and calculates a defocusing direction and defocusing amount for an in-focus position of the photographing lens 11 by using a publicly known phase difference system on the basis of the acquired pixel data.

The video encoder 35 reads the display image data created by the image processing section 31, and temporarily stored in the DRAM 41, and outputs the read display image data to the display section 37.

The display section 37 is a display section such as a liquid crystal display or an organic EL display, and is arranged, for example, on the back or the like of the camera 1. The display section 37 displays an image in accordance with display image data input thereto from the video encoder 35. The display section 37 is used for live-view display, display or the like of a recorded image.

The bus 39 is connected to the ADC 27, CPU 29, image processing section 31, focus detecting circuit 33, video encoder 35, DRAM 41, ROM 43, and recording medium 45, and various data items occurring in these blocks are transferred through the bus 39.

The DRAM 41 is an electrically rewritable memory, and temporarily stores therein various data items such as the aforementioned imaging data (pixel data), recording image data, display image data, and processing data in the CPU 29. As a memory for temporary storage, a synchronous dynamic random access memory (SDRAM) may be used.

The ROM 43 is a nonvolatile memory such as a mask ROM, flash memory, and the like. The ROM 43 stores therein various data items such as a program used by the CPU 29, adjustment value and the like of the camera 1.

The recording medium 45 is configured to be incorporated in the camera 1 or to be freely attachable to the camera 1, and recording image data as an image file of a predetermined format is recorded therein.

Figure 2:
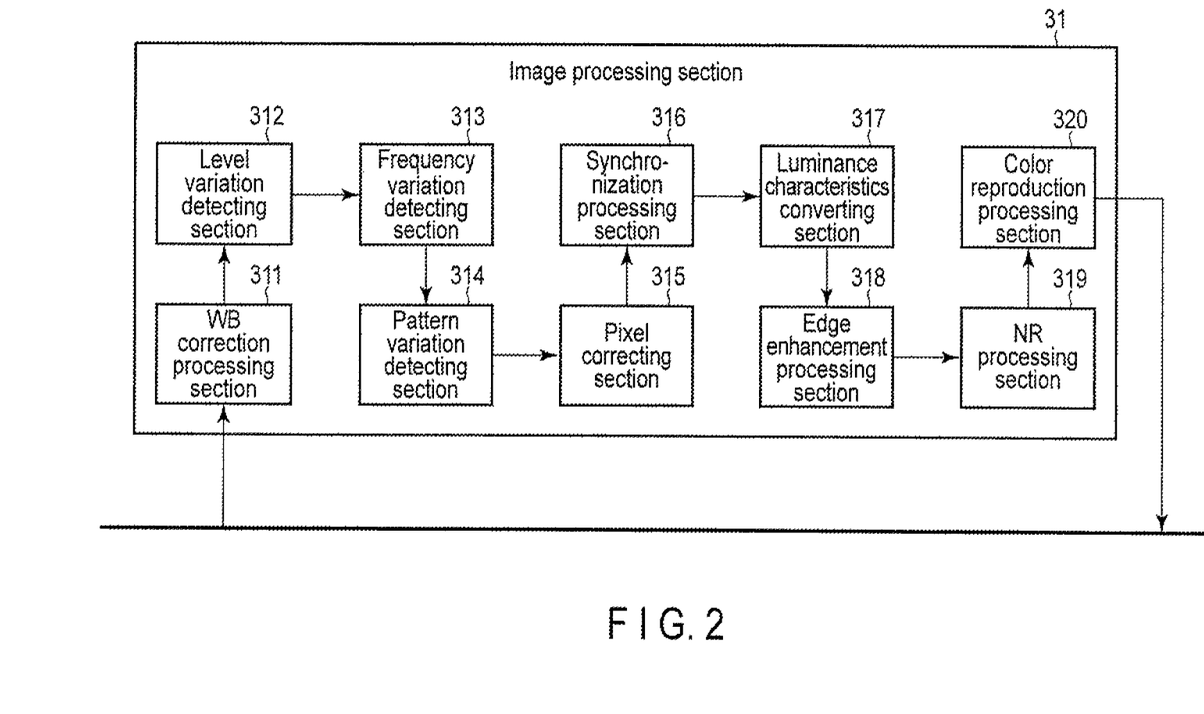
FIG. 2 is a view showing a detailed configuration of an image processing section.

FIG. 2 is a view showing the detailed configuration of the image processing section 31 as an example of an image processing apparatus according to this embodiment. In FIG. 2, blocks other than the image processing section 31 are omitted from the illustration.

The image processing section 31 includes a white balance (WB) correction processing section 311, level variation detecting section 312, frequency variation detecting section 313, pattern variation detecting section 314, pixel correcting section 315, synchronization processing section 316, luminance characteristics converting section 317, edge enhancement processing section 318, noise reduction (NR) processing section 319, and color reproduction processing section 320. Further, although omitted in the illustration, the image processing section further includes a compression/expansion processing section, and the like.

The WB correction processing section 311 amplifies each color component of the imaging data at a gain of a predetermined value to thereby correct the color balance of the image.

The level variation detecting section 312 functioning as a first pixel output detecting section detects a variation (a ratio between pixel data values or a difference between pixel data values) in pixel output between the phase difference detecting pixel and imaging pixel in the vicinity of the phase difference detecting pixel. The frequency variation detecting section 313 functioning as a third pixel output detecting section detects a variation in pixel output between a plurality of imaging pixels each of which is positioned in a direction different from a phase difference detection direction of each phase difference detecting pixel with respect to each phase difference detecting pixel. The pattern variation detecting section 314 functioning as a second pixel output detecting section detects a variation in pixel output between imaging pixels each of which is positioned in the vicinity of each of the phase difference detecting pixel and imaging pixel in the vicinity of the phase difference detecting pixels between which the level variation has been detected. The pixel correcting section 315 corrects the pixel data of the phase difference detecting pixel by using a detection result of the level variation detecting section 312, detection result of the frequency variation detecting section 313, and detection result of the pattern variation detecting section 314. The level variation detecting section 312, frequency variation detecting section 313, pattern variation detecting section 314, and pixel correcting section 315 will be described later in detail.

The synchronization processing section 316 converts imaging data in which one pixel corresponds to one color component such as the imaging data or the like output through the image sensor 21 in association with, for example, the Bayer arrangement into image data in which one pixel corresponds to a plurality of color components. The luminance characteristics converting section 317 converts the luminance characteristics of the image data created by the synchronization processing section 316 in such a manner that the luminance characteristics become suitable for display or recording. The edge enhancement processing section 318 multiplies an edge signal extracted from the image data by using a band-pass filter or the like by an edge enhancement coefficient, and adds a result of the multiplication to the original image data to thereby enhance the edge component of the image data. The NR processing section 319 removes a noise component of the image data by using coring processing or the like. The color reproduction processing section 320 carries out various processing operations for making color reproduction of an image appropriate. As the processing, there is, for example, color matrix operational processing. The color matrix operational processing is processing of multiplying the image data by, for example, a color matrix coefficient corresponding to the white balance mode. Further, the color reproduction processing section 320 carries out saturation/hue correction.

Figure 3:
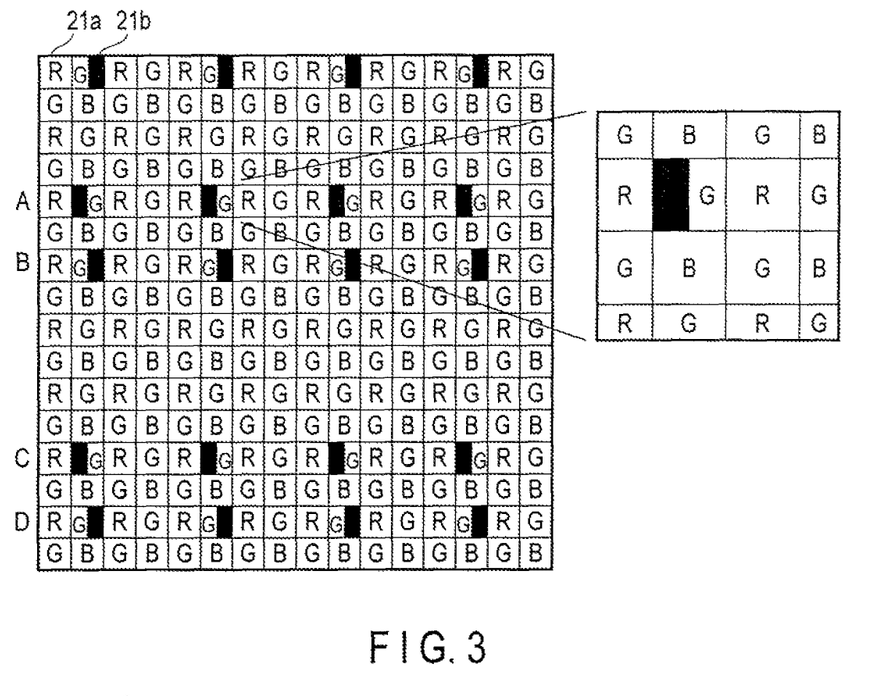
FIG. 3 is a view showing a pixel arrangement of an image sensor.

The configuration of the image sensor 21 will be described below by using FIG. 3. FIG. 3 is a view showing the pixel arrangement of the image sensor 21. Further, on the right side of FIG. 3, part of the pixels is shown in an enlarged manner.

Although FIG. 3 shows an example of the Bayer arrangement, the arrangement of a color filter is not limited to the Bayer arrangement, and various arrangements can be adopted.

As described previously, the image sensor 21 of the Bayer arrangement includes lines on which R pixels and G (Gr) pixels are alternately arranged and lines on which G (Gb) pixels and B pixels are alternately arranged, in the horizontal direction. In other words, in the image sensor 21 of the Bayer arrangement, as shown in the enlarged view on the right side, a set of the four pixels of the Gr pixel, R pixel, Gb pixel, and B pixel is repetitively arranged in the horizontal and vertical directions.

In this embodiment, at a position of part of imaging pixels 21a, a phase difference detecting pixel 21b is arranged. The phase difference detecting pixel is a pixel in which, for example, one of right and left areas of the pixel is shaded with a light-shading film. In the example of FIG. 3, a row of a phase difference detecting pixel half the surface thereof on the left side is shaded (hereinafter referred to as a right-opened phase difference detecting pixel), and a row of a phase difference detecting pixel half the surface thereof on the right side is shaded (hereinafter referred to as a left-opened phase difference detecting pixel) are arranged close to each other in the vertical direction.

In the case of an image sensor of a large number of pixels, an area of each pixel becomes small, and hence it can be considered that on each of pixels arranged close to each other, a substantially identical image is formed. Accordingly, by arranging phase difference detecting pixels in the manner shown in FIG. 3, it is possible to detect a phase difference by means of a pair constituted of a phase difference detecting pixel in the row A, and phase difference detecting pixel in the row B. Further, it is also possible to detect a phase difference by means of a pair constituted of a phase difference detecting pixel in the row C, and phase difference detecting pixel in the row D.

Here, in the example of FIG. 3, the area in the phase difference detecting pixel to be shaded is one of right and left areas. In this case, it is possible to detect a horizontal phase difference. Conversely, by making the area to be shaded one of upper and lower areas, or one of areas arranged in an oblique direction, it is also possible to detect a vertical phase difference or a phase difference in the oblique direction. Further, when an area is secured to a certain degree, the shaded area may not be half the pixel area. Furthermore, in FIG. 3, although the phase difference detecting pixel is arranged at a position of the G pixel, the phase difference detecting pixel may also be arranged at a position of one of the R pixel, and B pixel other than the G pixel.

Further, the example of FIG. 3 shows an example in which pupil division is achieved by shading a partial area of the phase difference detecting pixel. However, it is sufficient if the phase difference detecting pixel can selectively receive one of a pair of subject light flux components passing through different pupil regions of the photographing lens 11. Accordingly, the configuration in which a partial area of the phase difference detecting is shaded may not be adopted, but a configuration in which pupil division is achieved by means of, for example, microlenses for pupil division may be adopted.

Figure 4A:
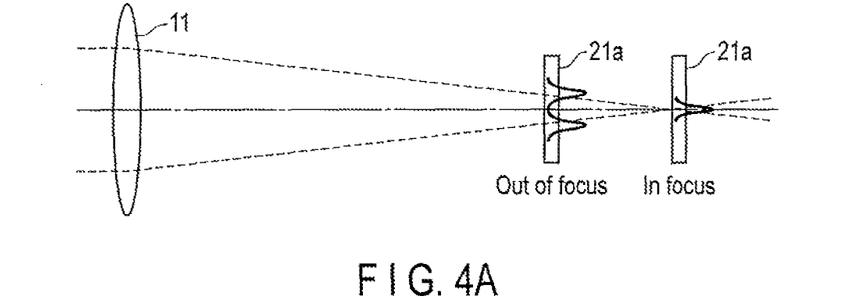
FIG. 4A is a view showing an image-formation state of an image in an imaging pixel.
Figure 4B:
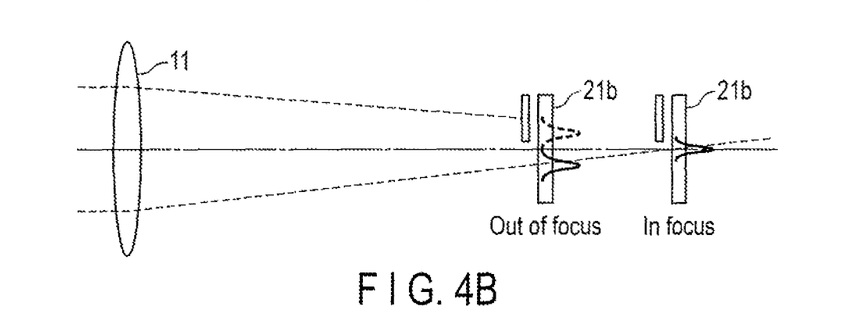
FIG. 4B is a view showing an image-formation state of an image in a phase difference detecting pixel.

The principle of the focus detection based on the phase difference method using the image sensor shown in FIG. 3 will be described below with reference to FIG. 4A and FIG. 4B. Here, FIG. 4A shows an image-formation state of an image in the imaging pixel 21a. Further, FIG. 4B shows an image-formation state of an image in the phase difference detecting pixel 21b.

In this description, it is assumed that the subject is a point light source. In this case, when the photographing lens 11 is in an in-focus state, subject light flux components forming a pair, output from the subject, and passing through different pupil regions symmetrical with respect to an optical axis center of the photographing lens 11 are formed into images at the same position on the image sensor 21. On the other hand, when the photographing lens 11 is in an out-of-focus state, subject light flux components forming a pair, output from the subject, and passing through different pupil regions of the photographing lens 11 are formed into images at different positions on the image sensor 21. In other words, a phase difference occurs between images formed by the subject light flux components forming a pair. By detecting the phase difference on the basis of a correlation between images detected by the right-opened phase difference detecting pixel and left-opened phase difference detecting pixel, a defocusing amount and defocusing direction of the photographing lens 11 are detected.

Here, a partial area of the phase difference detecting pixel 21b is shaded, and hence lowering of the amount of light is caused in the phase difference detecting pixel 21b. The lowering of the amount of light differs depending on, in addition to the area of the light-shading film formed on the phase difference detecting pixel 21b, the position of the light-shading film, angle of light incident on the phase difference detecting pixel 21b, and image height. Such lowering of the amount of light is corrected by the pixel correction processing to be described later.

Figure 5:
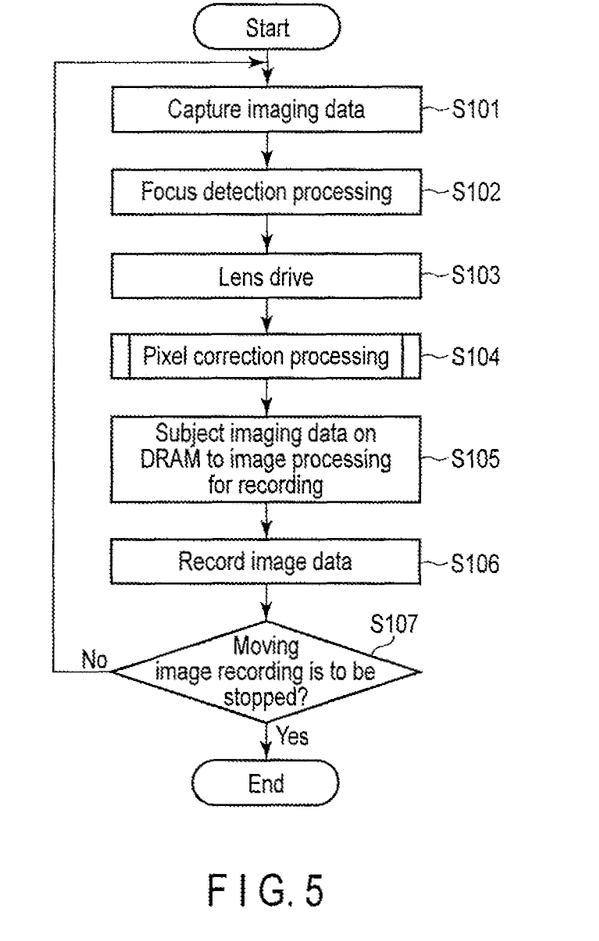
FIG. 5 is a flowchart showing processing of a moving image recording operation carried out by the imaging apparatus.

Hereinafter, the specific operation of the imaging apparatus of this embodiment will be described below. FIG. 5 is a flowchart showing processing of a moving image recording (moving image shooting) operation to be carried out by the imaging apparatus. The moving image recording operation is started when, for example, a release button is depressed in the moving image shooting mode. Further, the processing of the flowchart shown in FIG. 5 is executed by the CPU 29 in accordance with a program stored in the ROM 43. Although FIG. 5 shows the moving image recording operation, the image processing method according to this embodiment is also applicable to a still image recording operation.

When the operation of the flowchart of FIG. 5 is started, the CPU 29 starts capture of imaging data (step S101). Here, the CPU 29 inputs setting data corresponding to the current operation mode to the imaging control circuit 23. The imaging control circuit 23 controls reading of pixel data from the image sensor 21 in accordance with the setting data. When the reading system is set to the imaging control circuit 23, an image signal in a pixel-mixed state or a pixel-thinned state is read from the image sensor 21 in accordance with the reading system set to the imaging control circuit 23. The image signal read from the image sensor 21 is digitized in the ADC 27, and is thereafter temporarily stored in the DRAM 41 as imaging data.

Next, the CPU 29 carries out focus detection processing (step S102). Here, the CPU 29 causes the focus detecting circuit 33 to execute the focus detection processing. Upon receipt of an instruction to execute the focus detection processing, the focus detecting circuit 33 reads pixel data corresponding to the phase difference detecting pixel from among imaging data items temporarily stored in the DRAM 41, and calculates a defocusing direction and defocusing amount of the photographing lens 11 by using the read pixel data on the basis of a publicly known phase difference method.

Next, the CPU 29 carries out lens driving (step S103). Here, the CPU 29 controls the drive section 17 on the basis of the defocusing direction and defocusing amount of the photographing lens 11 detected in step S102 by the focus detecting circuit 33 to bring the photographing lens 11 into focus.

Next, the CPU 29 carries out pixel correction processing (step S104). Here, the CPU 29 causes the image processing section 31 to execute the pixel correction processing. The pixel correction processing will be described later in detail.

Next, the CPU 29 carries out image processing (step S105). Here, the CPU 29 executes image processing (synchronization processing and subsequent processing) for the imaging data obtained as a result of the pixel correction processing of step S104. As a processing parameter used for the image processing, a parameter for recording is used. The processing parameter for recording is, for example, a parameter stored in advance in the ROM 43. After the image processing, the CPU 29 records the image data temporarily stored in the DRAM 41 as a result of the image processing on the recording medium 45 (step S106).

Next, the CPU 29 determines whether or not the moving image recording is to be stopped (step S107). Here, the CPU 29 determines the operation state of the release button of the operation section 19. That is, when the release button is depressed again, the CPU 29 determines that the moving image recording is to be stopped. When it is determined in step S107 that the moving image recording is not to be stopped, the CPU 29 returns the processing to step S101, and continues the moving image recording. On the other hand, when it is determined in step S107 that the moving image recording is to be stopped, the CPU 29 terminates the processing of FIG. 5.

Figure 6:
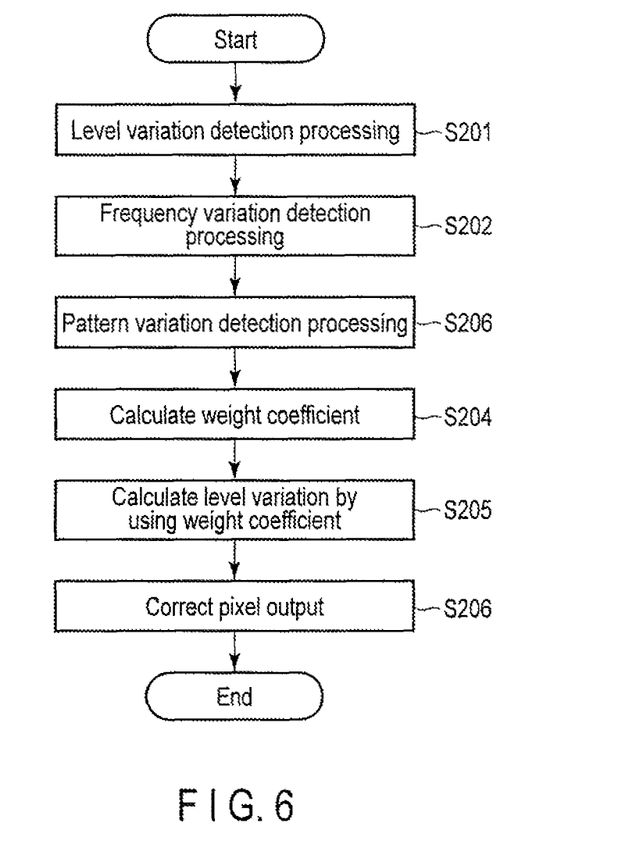
FIG. 6 is a flowchart showing details of pixel correction processing.

FIG. 6 is a flowchart showing details of pixel correction processing. The pixel correction processing is processing carried out by the core members of the level variation detecting section 312, frequency variation detecting section 313, pattern variation detecting section 314, and pixel correcting section 315 of the image processing section 31. Here, in the case of the image processing section shown in FIG. 2, although WB correction processing is carried out by the WB correction processing section 311 prior to the pixel correction processing, illustration thereof is omitted from FIG. 6. The WB correction processing may be carried out after the pixel correction processing.

When the operation of the flowchart of FIG. 6 is started, the level variation detecting section 312 executes the level variation detection processing with respect to the imaging data (step S201). The partial area of the phase difference detecting pixel is shaded, and hence the lowering of the amount of light described previously is caused. The level variation detection processing is processing for detecting the lowering amount (level variation) of the amount of light in the phase difference detecting pixel by detecting a variation (a ratio or a difference between pixel data values) between the pixel output of the phase difference detecting pixel and pixel output of the imaging pixel of the same color in the vicinity of the phase difference detecting pixel. In this embodiment, a ratio or a difference between a pixel data value of the phase difference detecting pixel and pixel data value of an imaging pixel, in a direction different from the detection direction of the phase difference among imaging pixels of the same color in the vicinity of the phase difference detecting pixel is detected.

Figure 7A:
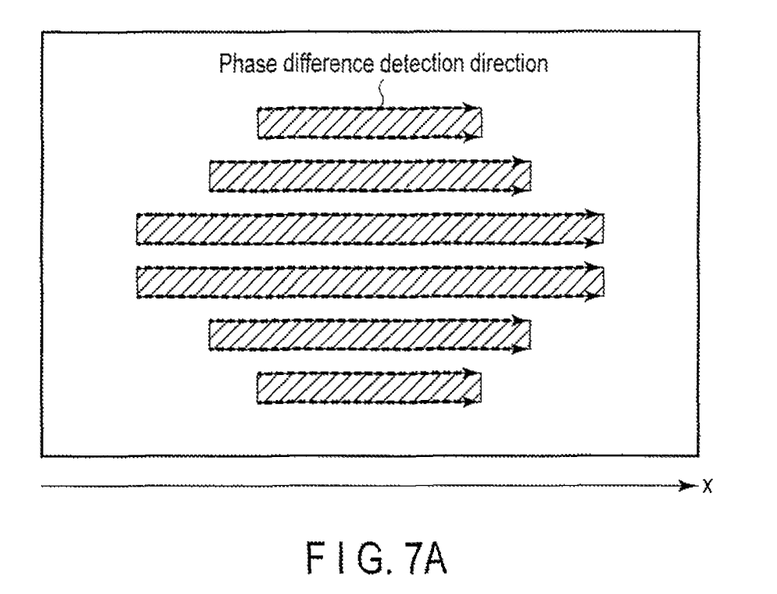
FIG. 7A and FIG. 7B are views for explaining level variation detection processing, frequency variation detection processing, and pattern variation detection processing.

For example, the level variation detection processing of a case where phase difference detecting pixels are arranged in the horizontal direction of the image sensor 21 in the manner shown in FIG. 7A will be described below. The phase difference detecting pixels 21b are arranged in the hatched areas (hereinafter referred to as island areas) of FIG. 7A. In each of the island areas, n pairs of a right-opened phase difference detecting pixel, and left-opened phase difference detecting pixel are arranged. In the following description, it is assumed that each of the right-opened phase difference detecting pixels and left-opened phase difference detecting pixels is arranged at a position of a Gr pixel as in the case of FIG. 3. Further, as shown in FIG. 7A, the horizontal direction of the image sensor 21 is defined as the x-axis. A start x coordinate of the phase difference detecting pixel in the horizontal direction in each island area is defined as start_x. Regarding start_x, start_x for the right-opened phase difference detecting pixel and start_x for the left-opened phase difference detecting pixel are defined.

Figure 7B:
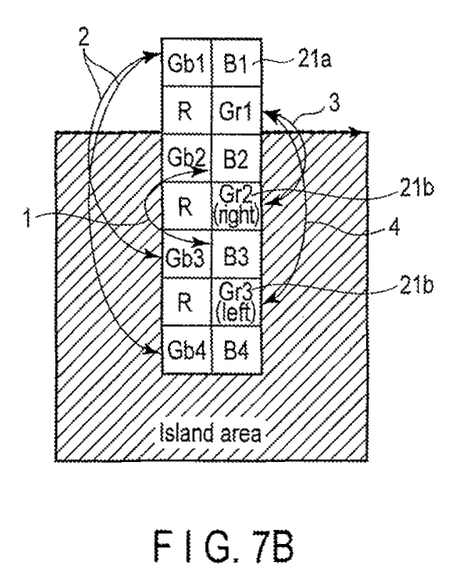

FIG. 7B is an enlarged view of pixels in the island area of FIG. 7A. It is assumed that the level variation detection processing is executed with respect to, for example, the right-opened phase difference detecting pixel Gr2 and left-opened phase difference detecting pixel Gr3 among pixels shown in FIG. 7B. At this time, a ratio or a difference between pixel data values of the right-opened phase difference detecting pixel Gr2 or the left-opened phase difference detecting pixel Gr3, and a nearby imaging pixel of the same color in a direction different from the horizontal direction which is the direction of phase difference detection carried out by each of the right-opened phase difference detecting pixel Gr2 and left-opened phase difference detecting pixel Gr3, i.e., in a direction perpendicular to the right-opened phase difference detecting pixel Gr2 and left-opened phase difference detecting pixel Gr3 is detected. Accordingly, regarding the right-opened phase difference detecting pixel Gr2, a ratio between pixel output values of the right-opened phase difference detecting pixel Gr2 and the imaging pixel Gr1 in which is the same column as the right-opened phase difference detecting pixel Gr2 is detected, as indicated by an arrow 3 of FIG. 7B. Further, regarding the left-opened phase difference detecting pixel Gr3, a ratio or a difference between pixel data values of the left-opened phase difference detecting pixel Gr3 and the imaging pixel Gr1 in which is the same column as the left-opened phase difference detecting pixel Gr3 is detected, indicated by an arrow 4 of FIG. 7B.

By the level variation detection processing described above, it is possible to detect the lowering amount of the amount of light of the phase difference detecting pixel relative to the imaging pixel by taking the influence of an area of the light-shading film formed on each phase difference detecting pixel, position of the light-shading film, angle of light incident on the phase difference detecting pixel, and image height into consideration. However, there is the possibility of the lowering amount of the amount of light detected by the level variation detection processing including a lowering amount of the amount of light caused by a variation in the image (pattern) itself. This is because the same image is not always formed even on an imaging pixel in the vicinity of the phase difference detecting pixel. Therefore, in the level variation detection processing, it is desirable that a variation in level between the phase difference detecting pixel and an imaging pixel of the same color as close to the phase difference detecting pixel as possible be detected.

In the aforementioned example, a level variation between the phase difference detecting pixel and an imaging pixel in the same column as the phase difference detecting pixel is detected. This is because the detection is carried out in order to estimate the tendency of level variation relative to the image height concomitant with a difference in angle of light incident on the phase difference detecting pixel caused by the characteristics of the photographing lens 11.

After the level variation detection processing, the frequency variation detecting section 313 executes frequency variation detection processing (step S202). The frequency variation detection processing is processing for detecting a tendency of a variation in spatial frequency in the vicinity of the phase difference detecting pixel. In this embodiment, a tendency of a variation in spatial frequency in a direction different from the detection direction of the phase difference is detected. As the specific processing of the frequency variation detection processing, a ratio or a difference between pixel data values of a plurality of pixels spatial frequencies of which in the phase detection direction are identical to each other among pixels around the phase difference detecting pixel is detected. In the example of FIG. 7B, pixels in the same column in the vertical direction as the phase difference detecting pixel are identical to each other in spatial frequency in the horizontal direction which is the detection direction of the phase difference. Accordingly, regarding the right-opened phase difference detecting pixel Gr2, a ratio or a difference between pixel data values of the imaging pixel B2 and imaging pixel B3 arranged to interpose the phase difference detecting pixel Gr2 between them is detected, as indicated by an arrow 1 of FIG. 7B. Further, regarding the left-opened phase difference detecting pixel Gr3, although not shown, a ratio or a difference between pixel data values of the imaging pixel B3 and imaging pixel B4 arranged to interpose the phase difference detecting pixel Gr3 between them is detected.

By the frequency variation detection processing described above, it is possible to detect a variation in spatial frequency in the vertical direction around the phase difference detecting pixel.

In the case of the Bayer arrangement, two pixels arranged adjacent to each other in the vertical direction to interpose the phase difference detecting pixel between them become imaging pixels of an identical color different from the color of the phase difference detecting pixel. However, these two pixels are not necessarily adjacent to each other, and they may be separate from each other. If only the two pixels are arranged opposite to each other to interpose the phase difference detecting pixel between them, they may be different from each other in the distance from the phase difference detecting pixel. Needless to say, the distances from the phase difference detecting pixel to the two pixels may be identical to each other. Further, in the case of a phase difference detecting pixel configured to detect a vertical phase difference, a ratio between pixel output values of two pixels adjacent to each other not in the vertical direction, but in the horizontal direction is detected.

After the frequency variation detection processing, the pattern variation detecting section 314 executes pattern variation detection processing (step S203). As the specific processing of the pattern variation detection processing, a ratio or a difference between pixel data values of pixels of the same color in the vicinities of the phase difference detecting pixel and imaging pixel which have been used in the level variation detection processing is detected. In the case of the example of FIG. 7B, regarding the right-opened phase difference detecting pixel Gr2, a ratio or a difference between pixel data values of the imaging pixel Gb3 in the vicinity of the right-opened phase difference detecting pixel Gr2 and imaging pixel Gb1 in the vicinity of the imaging pixel Gr1 is detected, as indicated by an arrow 2 of FIG. 7B. Regarding the left-opened phase difference detecting pixel Gr3, a ratio or a difference between pixel data values of the imaging pixel Gb4 in the vicinity of the left-opened phase difference detecting pixel Gr3 and imaging pixel Gb1 in the vicinity of the imaging pixel Gr1 is detected.

In the pattern variation detection processing described above, a variation in pixel output between imaging pixels in the vicinities of the phase difference detecting pixel and imaging pixel which have been used in the level variation detection processing is detected. In the case of the imaging pixels in the vicinities of the phase difference detecting pixel and imaging pixel which have been used in the level variation detection processing, it can be considered that images substantially identical to each other are formed on the imaging pixels. In this case, it is possible to consider that a variation in pixel output between the nearby imaging pixels is substantially due to a variation in image (pattern). Actually, the imaging pixels in the vicinities of the phase difference detecting pixel and imaging pixel which have been used in the level variation detection processing are adopted, and hence there is the possibility of an error occurring when the spatial frequency is high. Thus, the reliability of the pattern variation detection processing is determined from a detection result of the aforementioned frequency variation detection processing.

In the example of FIG. 7B, the two imaging pixels used to detect a ratio between pixel output values in the pattern variation detection processing are made pixels of the same color as the phase difference detecting pixel. However, the two imaging pixels are not necessarily required to be of the same color as the phase difference detecting pixel. However, it is desirable that the colors of the two imaging pixels be identical to each other. Although it is desirable that the distances between each of the two imaging pixels used to detect a ratio between pixel output values and phase difference detecting pixel in the vicinity of each of the two imaging pixels be equal to each other, the distances may be different from each other if the difference is rather small. In the case of a phase difference detecting pixel used to detect a vertical phase difference, a ratio between pixel output values of a plurality of pixels adjacent to each other not in the vertical direction, but in the horizontal direction is detected.

After the pattern variation detection processing, the pixel correcting section 315 calculates a weight coefficient W used to correct a detection result of the level variation detection processing for each island area (step S204). Hereinafter, an example of the calculation method of the weight coefficient W will be described. In this example, an example in which a weight coefficient W for the right-opened phase difference detecting pixel is calculated will be described. The weight coefficient W of the example is a coefficient which approaches 1 as a ratio between pixel data values of two imaging pixels of the same color in the same column in the vertical direction as the phase difference detecting pixel, the ratio being obtained as a result of the frequency variation detection processing, approaches 1. Such a weight coefficient W can be calculated by using the Gaussian function as in, for example, the following (formula 1). Here, regarding the weight coefficient W expressed by the (formula 1), the same value can be applied to right-opened phase difference detecting pixels in the same island area.

$$W = \exp\left(-\frac{(1 - \text{Dif\_B})^2}{\sigma}\right) \quad \text{(formula 1)}$$

Here, σ in (formula 1) is a standard deviation, and is arbitrarily set at the time of design, for example. For example, when a condition σ=0.1 is set, the Gaussian function of (formula 1) becomes a Gaussian function in which 0.1 is set as the standard deviation. Here, Dif_B in (formula 1) is a ratio between pixel data values of two imaging pixels of the same color in the same column in the vertical direction as the phase difference detecting pixel, and obtained as a result of the frequency variation detection processing. For example, when a pixel data value of the imaging pixel B2 is assumed to be B2 and a pixel data value of the imaging pixel B3 is assumed to be B3, the result Dif_B of the frequency variation detection processing is given by (formula 2) below.

$$Dif\_B = B2/B3 \quad \text{(formula 2)}$$

In the aforementioned example, the weight coefficient W is calculated by using the Gaussian function. When a method by which a coefficient that approaches 1 as a ratio between pixel data values of two imaging pixels of the same color in the same column in the vertical direction approaches 1 can be calculated is adopted, the weight coefficient W need not necessarily be calculated by using the Gaussian function.

After calculating the weight coefficient W, the pixel correcting section 315 calculates a light amount lowering amount (level variation amount) of the phase difference detecting pixel relative to the imaging pixel, the amount being obtained by taking a pattern variation into consideration (step S205). Hereinafter, an example of a method of calculating the level variation amount will be described. In this example, a relationship between the phase difference detecting pixel and imaging pixel concerning the level variation amount is approximated by a linear expression. For example, when a level variation amount of the phase difference detecting pixel at a position of a horizontal coordinate x relative to the imaging pixel is y, a linear expression expressing the level variation amount can be written in the form of y=ax+b. The gradient a and the intercept b of such a linear expression are given by, for example, the least squares method as shown by (formula 3) below.

$$a = \frac{(n-1)\sum_{i=start\_x}^{n-1}(i \times W) \times (Dif\_pRi \times W) - \sum_{i=start\_x}^{n-1}(i \times W) \sum_{i=start\_x}^{n-1}(i \times W) \times (Dif\_pRi \times W)}{(n-1)\sum_{i=start\_x}^{n-1}(i \times W)^2 - \left\{\sum_{i=start\_x}^{n-1}(i \times W)\right\}^2} \quad \text{(formula 3)}$$

$$b = \frac{\sum_{i=start\_x}^{n-1}(i \times W)^2 \sum_{i=start\_x}^{n-1}(Dif\_pRi \times W) - \sum_{i=start\_x}^{n-1}(i \times W) \times (W \times Dif\_pRi) \sum_{i=start\_x}^{n-1}(i \times W)}{(n-1)\sum_{i=start\_x}^{n-1}(i \times W)^2 - \left\{\sum_{i=start\_x}^{n-1}(i \times W)\right\}^2}$$

Here, Dif_pRi (i=start_x, start_x+1, ..., n−1) of (formula 3) is a ratio between pixel data values of the right-opened phase difference detecting pixel arranged at the horizontal coordinate x and imaging pixel in the vicinity of the right-opened phase difference detecting pixel, and obtained from a result of the level variation detection processing and result of the pattern variation detection processing. Further, Dif_pRi is given by (formula 4) below.

$$Dif\_pRi = 1 - \{(Gr1/Gr2) - Dif\_G\} \quad \text{(formula 4)}$$

Here, Dif_G of (formula 4) is a ratio between pixel data values of two imaging pixels in the vicinity of the pixel used in the level variation detection processing, and obtained as a result of the pattern variation detection processing. For example, when an example of the right-opened phase difference detecting pixel Gr2 is shown, Dif_G is given by (formula 5) below.

$$Dif\_G = 1 - Gb1/Gb3 \quad \text{(formula 5)}$$

In (formula 4), the pixel data value of the imaging pixel Gr1 is Gr1 and the pixel data value of the phase difference detecting pixel Gr2 is Gr2. Further, (formula 4) is a formula obtained by subtracting the level variation amount obtained by the pattern variation detection processing from the level variation amount obtained by the level variation detection processing. Accordingly, the level variation amount indicated by (formula 4) becomes a lowering amount of the amount of light of the phase difference detecting pixel relative to the imaging pixel, and obtained by taking the influence of an angle of light incident on the phase difference detecting pixel, and image height into consideration.

In the aforementioned example, although the relationship between the level variation amount and horizontal coordinate x is approximated by a linear expression, the relationship may also be approximated by a high order expression. The method of approximation is not limited to the least squares method, and Lagrange interpolation, spline interpolation, and the like may also be used.

After y for each horizontal coordinate x is calculated, the pixel correcting section 315 corrects the pixel output of each phase difference detecting pixel (step S206). For example, when a ratio between pixel data values is detected as a variation in pixel output in each of the level variation detection processing, frequency variation detection processing, and pattern variation detection processing, y indicated by (formula 3) is also expressed by a ratio between pixel data values. Accordingly, correction of the pixel output can be carried out by only carrying out gain adjustment of multiplying the pixel data of the phase difference detecting pixel by y corresponding to the horizontal coordinate x of the phase difference detecting pixel. On the other hand, when a difference between pixel data values is detected as a variation in pixel output in each of the level variation detection processing, frequency variation detection processing, and pattern variation detection processing, y indicated by (formula 3) is also expressed by a difference between pixel data values. Accordingly, correction of the pixel output can be carried out by only carrying out gain adjustment of offsetting the pixel data of the phase difference detecting pixel by y corresponding to the horizontal coordinate x of the phase difference detecting pixel.

As described above, in this embodiment, a variation in pixel output between the phase difference detecting pixel and imaging pixel in the vicinity thereof is actually detected, and the gain adjustment amount of each phase difference detecting pixel is calculated according to the detection result. Thereby, it is possible to carry out gain adjustment in which the influence of an area of the light-shading film formed on each phase difference detecting pixel, position of the light-shading film, angle of light incident on the phase difference detecting pixel, and image height is taken into consideration.

Further, in this embodiment, not only is a variation in pixel output between the phase difference detecting pixel and imaging pixel in the vicinity thereof simply detected, but also a variation in pixel output between imaging pixels in the vicinities of the above-mentioned pixel is detected, and the gain adjustment amount is corrected according to the detection results. Thereby, it is possible to correct even an error of a case where images formed on the phase difference detecting pixel and imaging pixel are different from each other.

Furthermore, in this embodiment, the result of the pattern variation detection processing is corrected in consideration of a variation in spatial frequency around the phase difference detecting pixel. Thereby, it is possible to further enhance the accuracy of gain adjustment. Here, although the frequency variation detection processing is necessary for enhancing the reliability of the pattern variation detection processing, the frequency variation detection processing may be omitted.

MODIFICATION EXAMPLE 1

Figure 8A:
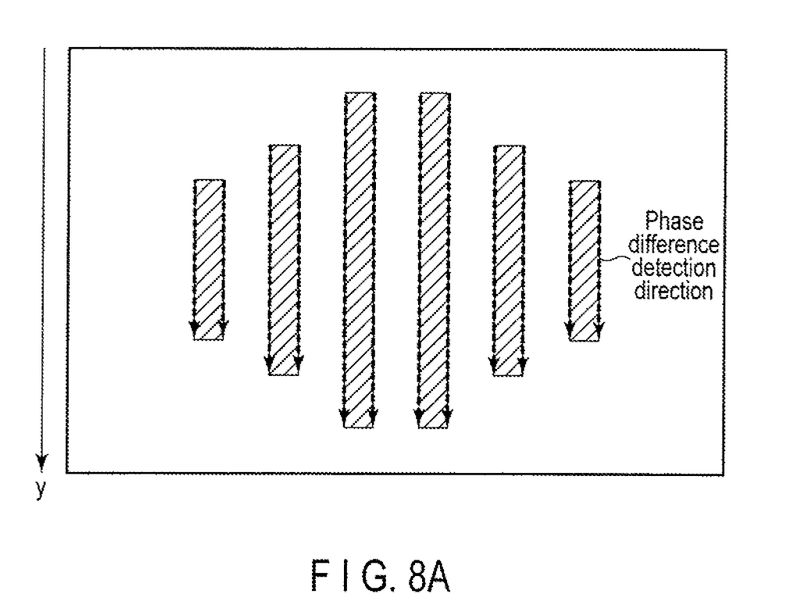
FIG. 8A and FIG. 8B are views for explaining level variation detection processing, frequency variation detection processing, and pattern variation detection processing of a modification example 1.
Figure 8B:
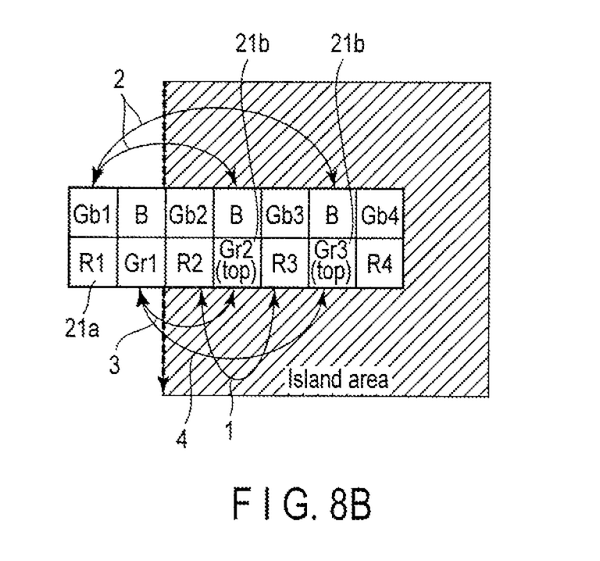

Hereinafter, a modification example of the aforementioned embodiment will be described. The aforementioned embodiment is an application example of the case where the detection direction of the phase difference is the horizontal direction. Conversely, this example is applicable even to a case where the detection direction of the phase difference is a direction other than the horizontal direction. Here, level variation detection processing, frequency variation detection processing, and pattern variation detection processing of a case where the detection direction of a phase difference is the vertical direction, i.e., a case where a phase difference detecting pixel is constituted of a pair formed of a top-opened phase difference detecting pixel and bottom-opened phase difference detecting pixel will be described.

A phase difference detecting pixel 21b is arranged in a hatched island area of FIG. 8A. In each of the island areas, n pairs of a top-opened phase difference detecting pixel and bottom-opened phase difference detecting pixel are arranged in each island area. In the following description, it is assumed that each of the top-opened phase difference detecting pixel and bottom-opened phase difference detecting pixel is arranged at a position of a Gr pixel as in FIG. 3. Further, as shown in FIG. 8A, the vertical direction of the image sensor 21 is defined as the y-axis. The start y coordinate of the phase difference detecting pixel in the vertical direction in each island area is defined as start_y. Regarding start_y, start_y for the top-opened phase difference detecting pixel and start_y for the bottom-opened phase difference detecting pixel are defined.

FIG. 8B is an enlarged view of pixels in the island area of FIG. 8A. It is assumed that the level variation detection processing is executed with respect to, for example, the top-opened phase difference detecting pixels Gr2 and Gr3 among pixels shown in FIG. 8B. At this time, a ratio or a difference between pixel data values of the top-opened phase difference detecting pixel Gr2 or the top-opened phase difference detecting pixel Gr3, and a nearby imaging pixel of the same color in a direction different from the vertical direction which is the direction of phase difference detection carried out by each of the top-opened phase difference detecting pixels Gr2 and Gr3, i.e., in a direction horizontally parallel to the top-opened phase difference detecting pixels Gr2 and Gr3 is detected. Accordingly, regarding the top-opened phase difference detecting pixel Gr2, a ratio between the pixel output values of the top-opened phase difference detecting pixel Gr2 and imaging pixel Gr1 in which is the same row as the top-opened phase difference detecting pixel Gr2 is detected, as indicated by an arrow 3 of FIG. 8B. Regarding the top-opened phase difference detecting pixel Gr3, a ratio or a difference between the pixel data values of the top-opened phase difference detecting pixel Gr3 and a nearby imaging pixel Gr1 which is in the same row as the top-opened phase difference detecting pixel Gr3 is detected, as indicated by an arrow 4 of FIG. 8B.

When the frequency variation detection processing is to be carried out, pixels in the same row in the horizontal direction as the phase difference detecting pixel are identical to each other in spatial frequency in the vertical direction, which is the detection direction of the phase difference. Accordingly, regarding the top-opened phase difference detecting pixel Gr2, a ratio or a difference between pixel data values of the imaging pixel R2 and imaging pixel R3 arranged to interpose the phase difference detecting pixel Gr2 between them is detected, as indicated by an arrow 1 of FIG. 8B. Regarding the top-opened phase difference detecting pixel Gr3, although not shown, a ratio or a difference between pixel data values of the imaging pixels R3 and imaging pixel R4 arranged to interpose the phase difference detecting pixel Gr3 between them is detected.

Furthermore, when the pattern variation detection processing is to be carried out, a ratio or a difference between pixel data values of pixels of the same color in the vicinities of the phase difference detecting pixel and imaging pixel which have been used in the level variation detection processing is detected. In the case of the example of FIG. 8B, regarding the top-opened phase difference detecting pixel Gr2, a ratio or a difference between pixel data values of the imaging pixel Gb3 in the vicinity of the top-opened phase difference detecting pixel Gr2 and imaging pixel Gb1 in the vicinity of the imaging pixel Gr1 is detected, as indicated by an arrow 2 of FIG. 8B. Further, regarding the top-opened phase difference detecting pixel Gr3, a ratio or a difference between pixel data values of the imaging pixel Gb4 in the vicinity of the top-opened phase difference detecting pixel Gr3 and imaging pixel Gb1 in the vicinity of the imaging pixel Gr1 is detected.

When a weight coefficient W is calculated by using a result detected in the manner described above, for example the weight coefficient W is calculated in the manner shown by, for example, (formula 6) below. It should be noted that, in this example, an example in which a weight coefficient W for the top-opened phase difference detecting pixel is calculated will be described. The weight coefficient W of this example is a coefficient which approaches 1 when a ratio between pixel data values of two imaging pixels of the same color in the same row in the horizontal direction as the phase difference detecting pixel and obtained as a result of the frequency variation detection processing approaches 1.

$$W = \exp\left(-\frac{(1 - \mathrm{Dif\_R})^2}{\sigma}\right) \quad \text{(formula 6)}$$

Here, σ in (formula 6) is a standard deviation, and is arbitrarily set at the time of design, for example. For example, when a condition σ=0.1 is set, the Gaussian function of (formula 6) becomes a Gaussian function in which 0.1 is set as the standard deviation.

Here, Dif_R in (formula 6) is a ratio between pixel data values of two imaging pixels of the same color in the same row in the horizontal direction as the phase difference detecting pixel, and obtained as a result of the frequency variation detection processing. For example, when a pixel data value of the imaging pixel R2 is R2, and pixel data value of the imaging pixel R3 is R3, the result Dif_R of the frequency variation detection processing is given by (formula 7) below.

$$\mathrm{Dif\_R} = R2/R3 \quad \text{(formula 7)}$$

When the final level variation amount is expressed in the form of x=ay+b as in the aforementioned embodiment, the gradient a and the intercept b of such a linear expression are given by, for example, the least squares method as shown by (formula 8) below.

$$a = \frac{(n-1)\sum_{i=start\_y}^{n-1}(i \times W) \times (\text{Dif\_pTi} \times W) - \sum_{i=start\_y}^{n-1}(i \times W) \sum_{i=start\_y}^{n-1}(i \times W) \times (\text{Dif\_pTi} \times W)}{(n-1)\sum_{i=start\_y}^{n-1}(i \times W)^2 - \left\{\sum_{i=start\_y}^{n-1}(i \times W)\right\}^2}$$ (formula 8)

$$b = \frac{\sum_{i=start\_y}^{n-1}(i \times W)^2 \sum_{i=start\_y}^{n-1}(\text{Dif\_pTi} \times W) - \sum_{i=start\_y}^{n-1}(i \times W) \times (W \times \text{Dif\_pTi}) \sum_{i=start\_y}^{n-1}(i \times W)}{(n-1)\sum_{i=start\_y}^{n-1}(i \times W)^2 - \left\{\sum_{i=start\_y}^{n-1}(i \times W)\right\}^2}$$

Here, Dif_pTi (i=start_x, start_x+1, ..., n−1) of (formula 8) is a ratio between pixel data values of the top-opened phase difference detecting pixel arranged at the vertical coordinate y and imaging pixel in the vicinity of the top-opened phase difference detecting pixel, and obtained from the result of the level variation detection processing, and result of the pattern variation detection processing. Further, Dif_pTi is given by (formula 9) below.

$$\text{Dif\_pTi} = 1 - \{(Gr1/Gr2) - \text{Dif\_G}\}$$ (formula 9)

Here, Dif_G of (formula 9) is a ratio between pixel data values of two imaging pixels in the vicinity of the pixel used in the level variation detection processing, and obtained as a result of the pattern variation detection processing. For example, when an example of the top-opened phase difference detecting pixel Gr2 is shown, Dif_G is given by (formula 10) below.

$$\text{Dif\_G} = 1 - Gb1/Gb3$$ (formula 10)

As in the case of (formula 4), the level variation amount indicated by (formula 10) becomes a light amount lowering amount of the phase difference detecting pixel relative to the imaging pixel, and is obtained by taking the influence of an angle of light incident on the phase difference detecting pixel and height of the image into consideration.

In the aforementioned example, although the relationship between the level variation amount and vertical coordinate y is approximated by a linear expression, the relationship may also be approximated by a high order expression. The method of approximation is not limited to the least squares method, and Lagrange interpolation, spline interpolation, and the like may also be used.

MODIFICATION EXAMPLE 2

In the aforementioned example, the weight coefficient W is made the Gaussian function, and further, the weight coefficient W can be obtained by, for example, approximation using a threshold. The linear expression expressing the level variation amount can also be obtained not by using the least squares method, but by using break point approximation. Modification example 2 is an example in which the weight coefficient W, a gradient a, and an intercept b of a linear expression expressing the level variation amount are obtained by using such other methods.

Figure 9:
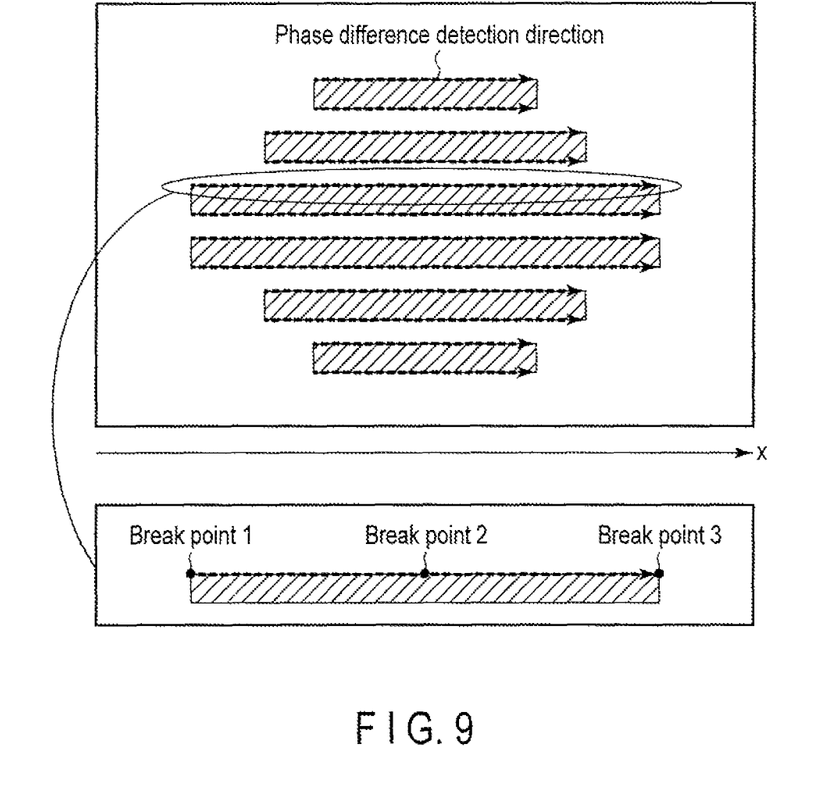
FIG. 9 is a view for explaining a modification example 2.

In this modification example, as shown in FIG. 9, m points (in FIG. 3, break points 1, 2, and 3) are determined in one island area, and then the level variation detection processing, frequency variation detection processing, and pattern variation detection processing which are the same as those described previously are carried out. In this case, the weight coefficient W can be obtained by separating the mean value of Dif_G and Dif_B into cases by using a threshold in the manner shown by (formula 11) below. It should be noted that (formula 11) is an example in which the detection direction of the phase difference is the vertical direction.

$$W = \begin{cases} 3 & (\text{Dif\_B} + \text{Dif\_G})/2 < 0.1 \\ 2 & (\text{Dif\_B} + \text{Dif\_G})/2 < 0.3 \\ 1 & \text{otherwise} \end{cases}$$ (formula 11)

Here, Dif_G of (formula 11) is an absolute value of a ratio between pixel data values of two imaging pixels in the vicinity of a pixel which has been used in the level variation detection processing, and obtained as a result of the pattern variation detection processing. For example, assuming that the aforementioned right-opened phase difference detecting pixel Gr2 is one of break points, Dif_G is given by (formula 12) below.

$$\text{Dif\_G} = \text{abs}(1 - Gb1/Gb3)$$ (formula 12)

Further, Dif_B of (formula 11) is an absolute value of a ratio between pixel data values of two imaging pixels of the same color in the same column in the vertical direction as the phase difference detecting pixel, and obtained as a result of the frequency variation detection processing. For example, assuming that the pixel data value of the imaging pixel B2 is B2, and the pixel data value of the imaging pixel B3 is B3, Dif_B is given by (formula 13) below.

$$\text{Dif\_B} = \text{abs}(1 - B2/B3)$$ (formula 13)

Further, a gradient a and an intercept b of a linear expression y=ax+b expressing the level variation amount are given as shown by following (formula 14).

$$a\_m = \begin{cases} \dfrac{(p\_m+1 - p\_m)}{n-1} & p\_m < p\_m+1 \\ -\dfrac{(p\_m - p\_m+1)}{n-1} & \text{otherwise} \end{cases}$$ (formula 14)

$$b\_m = (n-1) - (a\_m \times p\_m+1)$$

Here, a_m, and b_m (m=1, 2) shown in (formula 14) indicate that they are respectively the gradient, and intercept of the linear expression indicating the variation amount from the break point m to the break point m+1. Further, P_m (m=1, 2) is given by formula (15) below.

$$p\_m = \frac{\sum_{i=start\_x}^{n-1} \text{Dif\_pRi} \times W}{\sum_{i=start\_x}^{n-1} W}$$ (formula 15)

Here, Dif_pRi (i=start_x, start_x+1, ..., n−1) of (formula 15) is a ratio between pixel data values of the phase difference detecting pixel arranged at the horizontal coordinate x and imaging pixel in the vicinity thereof, and obtained from a result of the level variation detection processing and result of the pattern variation detection processing. Further, Dif_pRi is given by (formula 16) below.

$$\text{Dif}\_pRi = 1 - \{(Gr1/Gr2) - \text{Dif}\_G\} \quad \text{(formula 16)}$$

Further, in the aforementioned example, although the start x coordinate in the horizontal direction of a phase difference detecting pixel in each island area is defined as start_x, in the modification example, it is assumed that the x coordinate of each break point is defined as start_x, and n pixels are arranged between break points.

Each of the processing items described above in the embodiment and modification examples thereof can also be stored as a program which can be executed by the CPU 29. Further, the program can be stored in a storage medium of an external storage device such as a memory card (ROM card, RAM card, etc.), magnetic disk (hard disk, etc.), optical disk (CD-ROM, DVD, etc.), semiconductor memory, and the like, and can be distributed. Further, the CPU 29 reads the program stored in the storage medium of the external storage device, and the operation is controlled by the read program, whereby the CPU 29 can execute the above-mentioned processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus configured to process a pixel output from an image sensor including phase difference detecting pixels and imaging pixels arranged in a direction in which a phase difference by obtaining pupil dividing is detected, the apparatus comprising:
    a first pixel output variation detecting section configured to detect a variation between a pixel output of the phase difference detecting pixel and a pixel output of the imaging pixel of a same color as the phase difference detecting pixel, the imaging pixel positioned in a direction different from a direction of phase difference detection carried out by the phase difference detecting pixel;
    a second pixel output variation detecting section configured to detect a variation in pixel output between a plurality of imaging pixels positioned in vicinities of the phase difference detecting pixel and the imaging pixel used by the first pixel output variation detecting section to detect the variation in pixel output; and
    a pixel correcting section configured to correct the pixel output of each phase difference detecting pixel on the basis of results of the first pixel output variation detecting section and the second pixel output variation detecting section.

2. The image processing apparatus of claim 1, wherein the imaging pixels between which the second pixel output variation detecting section detects the variation in pixel output are of the same color.

3. The image processing apparatus of claim 1, wherein one of the imaging pixels used by the second pixel output variation detecting section to detect the variation in pixel output is adjacent to the phase difference detecting pixel used by the first pixel output variation detecting section to detect the variation in pixel output, and the other is adjacent to the imaging pixel used by the first pixel output variation detecting section to detect the variation in pixel output.

4. The image processing apparatus of claim 3, wherein a distance between the phase difference detecting pixel used by the first pixel output variation detecting section to detect the variation in pixel output and the one imaging pixel, and a distance between the imaging pixel used by the first pixel output variation detecting section to detect the variation in pixel output and the other imaging pixel are equal to each other, or one of the distances is longer than the equal distances.

5. The image processing apparatus of claim 1, further comprising a third pixel output variation detecting section configured to detect a variation in pixel output between a plurality of imaging pixels of a color different from the phase difference detecting pixel, and positioned in a direction different from the direction of phase difference detection, wherein
    the pixel correcting section corrects the pixel output of each phase difference detecting pixel on the basis of a result of the third pixel output variation detecting section in addition to the results of the first pixel output variation detecting section, and the second pixel output variation detecting section.

6. The image processing apparatus of claim 5, wherein each of the imaging pixels used by the third pixel output variation detecting section to detect the variation in pixel output is adjacent to the phase difference detecting pixel.

7. The image processing apparatus of claim 6, wherein the imaging pixels used by the third pixel output variation detecting section to detect the variation in pixel output are at positions at which the imaging pixels are opposed to each other with the phase difference detecting pixel interposed between the imaging pixels or at positions at which the phase difference detecting pixel is interposed between the imaging pixels at equal distances from the imaging pixels or at positions at which the phase difference detecting pixel is interposed between the imaging pixels at different longer distances from the imaging pixels than the equal distances.

8. The image processing apparatus of claim 1, wherein the direction different from the direction of phase difference detection is a direction perpendicular to the direction of phase difference detection.

9. An image processing method used to process a pixel output from an image sensor including phase difference detecting pixels and imaging pixels arranged in a direction in which a phase difference by obtaining pupil dividing is detected, the method comprising:
    detecting, by means of a first pixel output variation detecting section, a variation between a pixel output of the phase difference detecting pixel and a pixel output of the imaging pixel of a same color as the phase difference detecting pixel, the imaging pixel positioned in a direction different from a direction of phase difference detection carried out by the phase difference detecting pixel;
    detecting, by means of a second pixel output variation detecting section, a variation in pixel output between a plurality of imaging pixels positioned in the vicinities of the phase difference detecting pixel and the imaging pixel used by the first pixel output variation detecting section to detect the variation in pixel output; and
    correcting, by means of a pixel correcting section, the pixel output of each phase difference detecting pixel on the basis of results of the first pixel output variation detecting section, and the second pixel output variation detecting section.

10. A non-transitory recording medium on which an image processing program used to process a pixel output from an image sensor including phase difference detecting pixels and imaging pixels arranged in a direction in which a phase difference by obtaining pupil dividing is detected is recorded, the image processing program causing a computer to execute:

detecting, by means of a first pixel output variation detecting section, a variation between a pixel output of the phase difference detecting pixel and a pixel output of the imaging pixel of a same color as the phase difference detecting pixel, the imaging pixel positioned in a direction different from a direction of phase difference detection carried out by the phase difference detecting pixel;

detecting, by means of a second pixel output variation detecting section, a variation in pixel output between a plurality of imaging pixels positioned in the vicinities of the phase difference detecting pixel and the imaging pixel used by the first pixel output variation detecting section to detect the variation in pixel output; and     correcting, by means of a pixel correcting section, the pixel output of each phase difference detecting pixel on the basis of results of the first pixel output variation detecting section, and the second pixel output variation detecting section.

\* \* \* \* \*